(12) United States Patent
Gocze

(10) Patent No.: US 8,430,155 B2
(45) Date of Patent: Apr. 30, 2013

(54) MODULAR INSULATED WATER TANK

(76) Inventor: Thomas Gocze, Searsport, ME (US)

( * ) Notice: Subject to any disclaimer, the term of this patent is extended or adjusted under 35 U.S.C. 154(b) by 994 days.

(21) Appl. No.: 12/482,078

(22) Filed: Jun. 10, 2009

(65) Prior Publication Data
US 2010/0314398 A1    Dec. 16, 2010

(51) Int. Cl.
    *F28D 20/00*       (2006.01)
(52) U.S. Cl.
    USPC ..................................... 165/163; 220/592.09
(58) Field of Classification Search ............... 165/10, 165/47, 135, 136, 157, 163; 126/640, 641, 126/910; 220/592.01, 592.24–592.28, 592.2
See application file for complete search history.

(56) References Cited

U.S. PATENT DOCUMENTS

| | | | | |
|---|---|---|---|---|
| 3,583,351 | A * | 6/1971 | Gorman | 114/74 A |
| 4,177,614 | A * | 12/1979 | Arp | 52/247 |
| 4,660,594 | A | 4/1987 | Gocze | |
| 4,862,661 | A * | 9/1989 | Moore | 52/247 |
| 5,313,933 | A * | 5/1994 | Gocze | 126/674 |
| 5,579,836 | A * | 12/1996 | Maruyama | 165/175 |
| 5,761,854 | A * | 6/1998 | Johnson et al. | 52/69 |
| 5,791,099 | A * | 8/1998 | Duffy | 52/169.7 |
| 6,644,393 | B2 * | 11/2003 | Roberts et al. | 165/174 |
| 7,100,259 | B2 * | 9/2006 | Morales et al. | 29/421.1 |
| 2005/0132487 | A1 * | 6/2005 | Layfield et al. | 4/541.1 |
| 2009/0064404 | A1 * | 3/2009 | Frei | 4/506 |
| 2010/0319890 | A1 * | 12/2010 | Tjernagel | 165/163 |

\* cited by examiner

*Primary Examiner* — Steven B McAllister
*Assistant Examiner* — John Bargero
(74) *Attorney, Agent, or Firm* — Anthony D. Pellegrini

(57) ABSTRACT

A modular insulated water tank comprising a hollow insulated support structure, a liner, and an insulated cover, with the support structure being comprised of two or more separable, vertically stackable retention tiers, the liner being a flexible container capable of retaining fluids within the interior of the support structure, and the cover being capable of enclosing contents contained within the interior of the water tank. So configured, the modular insulated water tank is capable of retaining a large quantity of fluid, such as water, at an elevated temperature for an extended length of time, for purposes of using the heat energy stored therein for space heating purposes or for domestic hot water use. The modular water tank employs a heating exchange interface comprised of inflow and outflow conduits and a heat exchanger, capable of bringing fluids into and out of the water tank to either release heat energy into the fluid contained in the water tank for heat storage or to absorb heat energy from the fluid contained in the water tank for heat use. The modular design of the water tank allows it to be easily shipped and stored, and assembled in otherwise difficult to access locations. The water tank is intended to be used to store heat energy generated by an external heat source, such as a boiler, solar collectors, or a wood stove.

3 Claims, 8 Drawing Sheets

MODULAR INSULATED WATER TANK

FIELD OF THE INVENTION

The invention relates generally to environmental climate control devices, namely, heat energy storage devices. Specifically, an aspect of the present invention relates to an improvement on water storage tanks for storing heat energy for residential and commercial use, where the heat energy is produced asynchronously by boilers, solar collectors, wood stoves, and the like. Improvements disclosed in the present invention include a modular configuration of the water tank to allow for easy manufacture, shipping, and storage, as well as easy assembly and disassembly in difficult to access locations.

BACKGROUND

Water may be used as a storage medium for heat. In residential and commercial settings, this may be accomplished by use of a water storage tank. The tank is filled with water and then heat energy from an external source, such as solar collectors, geothermal heating, biomass, wood pellets, cogeneration, or even traditional fossil fuels or electrical sources, is used to raise the temperature of the water in the tank. The heat energy stored in the water may then be extracted for use in space heating or for domestic hot water purposes, or the heated water itself may be used for these purposes. Because water is capable of absorbing and retaining a great amount of heat energy, it is a cost-effect medium for storing heat energy that is collected or generated at a time other than when it is to be used.

Typically, water storage tanks are constructed of steel and are lined with glass or concrete or some other massive material which insulates and helps retain heat. The tanks are also often wrapped in bulky insulation. However, this method of tank construction creates heavy and cumbersome tanks that are difficult to install. For example, the basement of a home or building is often the desired location for a water storage tank, but access to a basement is usually through a narrow staircase or small window. Therefore, traditional water storage tanks were usually limited in size, reducing the amount of heat energy that could be stored and eliminating efficiencies. In order to use make use of larger quantities of water to store heat energy (say, over 100 gallons), either multiple small tanks were necessary or large tanks were built on site, at substantial cost.

There have been attempts to solve the problem of bringing large tanks into difficult to access locations. For example, U.S. Pat. No. 4,660,594 (Apr. 28, 1987), to Gocze, discloses a portable collapsible tank for storing and insulating heated water, in which the tank is comprised of an elongate flexible and foldable outer cylindrical sleeve formed with sufficient tensile strength to support the tank and water stored therein. These tanks could store up to 1500 gallons and were relatively easy to install, though time consuming. However, the water storage tanks of the '594 patent are not structurally rigid, thereby leading to some inherent disadvantages, primarily that they are not designed to bear a load on their covers. Thus, persons climbing onto or placing objects on top of these tanks could inadvertently cause failure. Moreover, the substantially circular footprint of these tanks is an inefficient use of floor space.

There thus remains a need for a water storage tank that is easy to manufacture, ship, and store, while providing the capability of storing a large quantity of water for long term retention of heat energy for later uses, which is also quick and easy to assemble in any location, is significantly stronger than previously patented tank designs, has a more efficient square configuration to better fit into buildings, and is structurally rigid to provide a greater margin of safety during use.

It is therefore an object of an aspect of the invention to provide an improved modular insulated water tank which is easy to manufacture, ship, and store.

It is a further object of an aspect of the invention to provide an improved modular insulated water tank which is easy to assemble and disassemble for use in difficult to access locations.

It is yet a further object of an aspect of the invention to provide an improved modular insulated water tank capable of storing a large quantity of water for long term retention of heat energy for later uses.

It is yet a further object of an aspect of the invention to provide an improved modular insulated water tank that is structurally rigid and capable of bearing external weight without failure.

It is yet a further object of an aspect of the invention to provide an improved modular insulated water tank that utilizes an efficient footprint to better fit within a structure.

It is yet a further object of an aspect of the invention to provide an improved modular insulated water tank which may be easily integrated with an external heating source, such as a boiler, solar collectors, a wood stove, a geothermal heating system, a biomass heating system, cogeneration, a fossil fuel burner, or electrical heat source.

It is yet a further object of an aspect of the invention to provide an improved modular insulated water tank which efficiently integrates with a space heating system or a domestic hot water system.

It is yet a further object of an aspect of the invention to provide an improved modular insulated water tank which can be easily reconfigured to contain greater or lesser quantities of water for heat energy storage purposes, as needed.

Other objects of this invention will be apparent to those skilled in the art from the description and claims which follow.

SUMMARY OF THE INVENTION

An aspect of the present invention discloses a modular insulated water tank useful for storing heat energy generated by an external heat source, such as a boiler, solar collectors, or a wood stove, which typically produces heat at a time when heat may not be called for. The modular configuration of the water tank allows it to be easily manufactured, shipped, and stored, and easily assembled in otherwise difficult to access locations, such as basements. The insulating properties of the water tank permit it to retain a large quantity of fluid, such as water, at an elevated temperature for an extended length of time, whereby the stored heat energy is made available for space heating purposes or domestic hot water use as required.

The modular water tank is comprised of a hollow insulated support structure, a liner, and an insulated cover. The support structure is comprised of two or more separable, vertically stackable retention tiers. The liner is a flexible container capable of retaining fluids within the interior of the support structure, and the cover encloses the contents of the water tank. A heating exchange interface comprised of inflow and outflow conduits and a heat exchanger, capable of bringing fluid into and out of the water tank for purposes of either releasing heat energy or absorbing heat energy, is contained within the support structure and integrated with the external heat source and the external heating system or domestic hot water system.

The retention tiers are fashioned of modular side walls and then stacked onto each other to form the support structure. The side walls of each retention tier may be removably joined to each other for easy assembly and disassembly. Reinforcement members may be employed to increase the rigidity of the side walls.

Other features and advantages of the invention are described below.

DETAILED DESCRIPTION OF THE INVENTION

Figure 1:
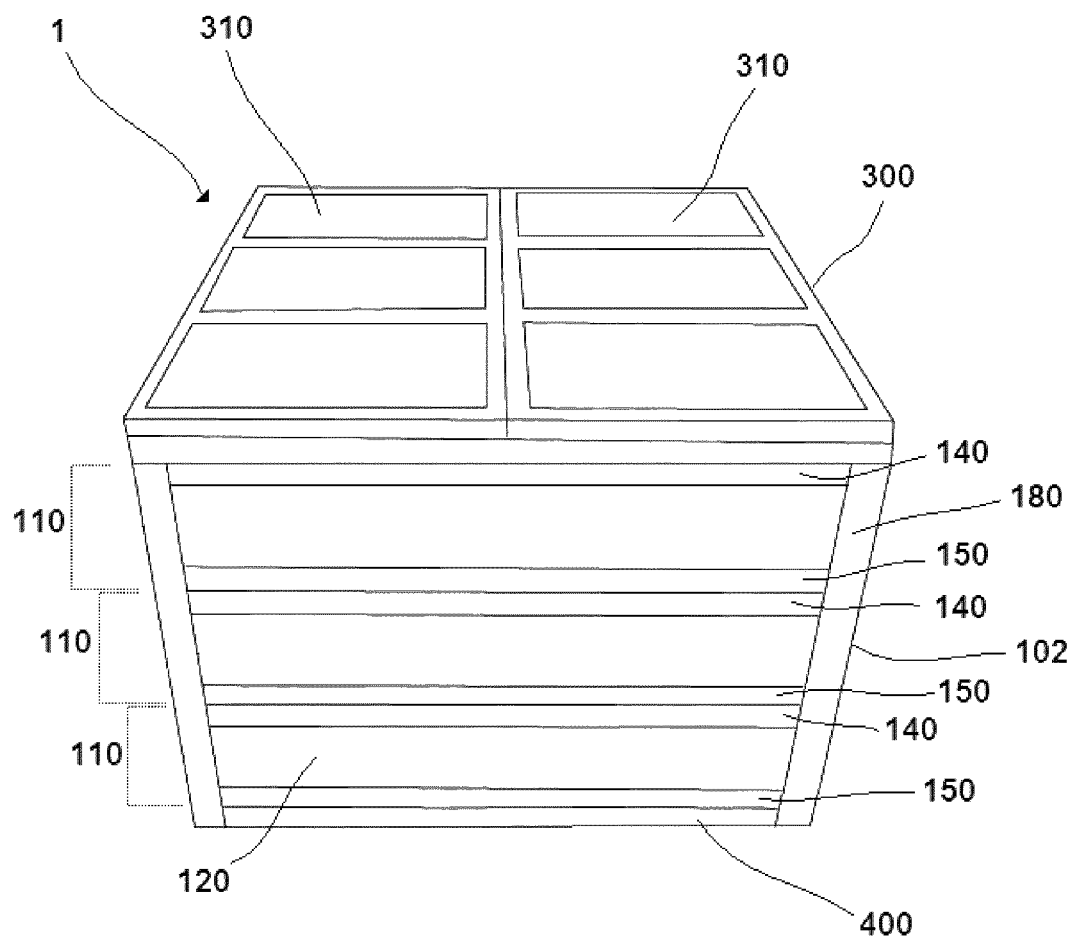
FIG. 1 is a front perspective view of one aspect of the present invention, representing an embodiment having three retention tiers, each retention tier having four sides, and a cover comprising sub-covers.
Figure 2:
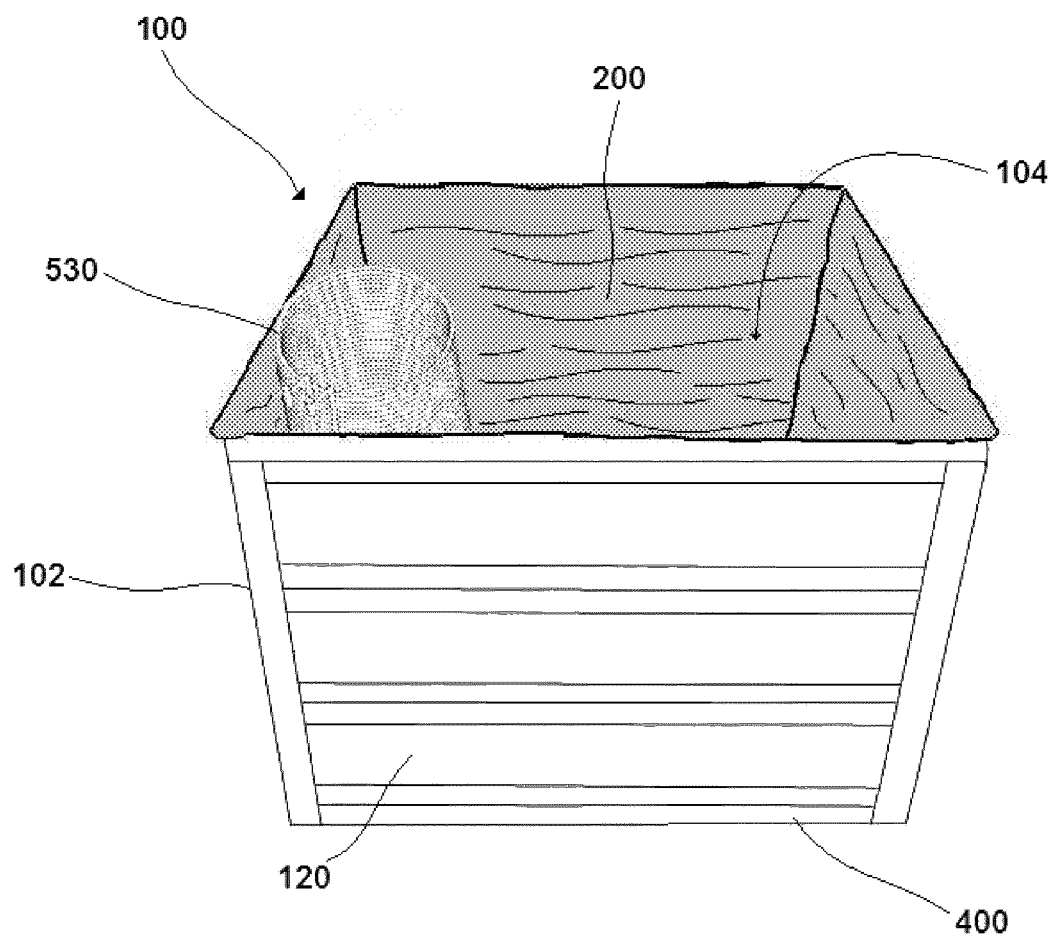
FIG. 2 is the same view depicted in FIG. 1 except with the cover removed, thereby revealing the interior of the device in which the liner and the heating system interface are located.
Figure 3:
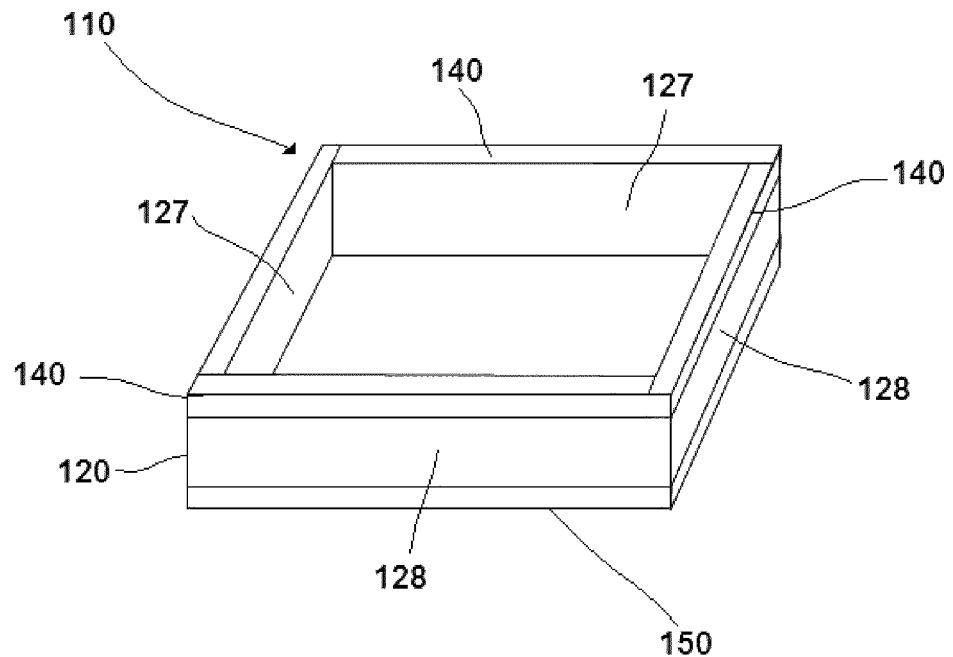
FIG. 3 is a perspective view of a single retention tier. In the depicted embodiment the retention tier is four sided and utilizes top and bottom reinforcement members.

An aspect of the present invention discloses a modular insulated water tank 1 capable of storing thermally isolated fluid. The water tank 1 comprises a support structure 100, a liner 200, and a cover 300. See FIGS. 1 and 2. The support structure 100 is a substantially hollow enclosure formed of a plurality of substantially rigid sides 102 surrounding an interior 104. It must be capable of containing and supporting the liner 200 within its interior 104 when the liner 200 contains fluid. Moreover, the sides 102 of the support structure 100 must be thermally isolatable, to minimize the loss of heat energy from the fluid contained within the water tank 1. The support structure 100 is further comprised of two or more separable, stackable retention tiers 110. See FIG. 3. Because the retention tiers 110 are separable, the support structure 100 may be broken down for ease of shipment and storage.

The liner 200 is a flexible container capable of retaining fluids. In the preferred embodiment the liner 200 is a large, water-impermeable bag with an opening oriented upwards. The liner 200 should be dimensioned to fit within and substantially fill the interior 104 of the support structure 100. When filled with a fluid, preferably water, the liner 200 is supported by the support structure 100. The liner 200 may be constructed of polyethylene, polypropylene, polyvinyl chloride (PVC), ethylene propylene diene monomer rubber (EPDM rubber), or any other flexible, sturdy, water-impermeable material. In the preferred embodiment the liner 200 is constructed of 30 mil high temperature PVC.

The cover 300 of the water tank 1 is suitably adapted to enclose the contents contained within the liner 200 within the interior 104 of the support structure 100. The cover 300 must be thermally isolatable to minimize the loss of heat energy from the fluid contained within the water tank 1. In one embodiment the cover 300 is constructed of the same material as comprises the rigid sides 102 of the support structure 100. In another embodiment the cover 300 is comprised of two or more sub-covers 310 which fit together to form a single cover 300. See FIG. 1. The use of sub-covers 310 allows for easier shipping and storage of the water tank 1. It also allows for a subset of the sub-covers 310 to be fixedly attached to the support structure 100, for security, with others being removable from the support structure 100 to permit access to the interior 104 of the support structure 100. Caulk may be used to further seal the cover 300 or one or more of the sub-covers 310. In other embodiments the cover 300 or one or more of the sub-covers 310 may be hingedly attached to the support structure 100.

Figure 6:
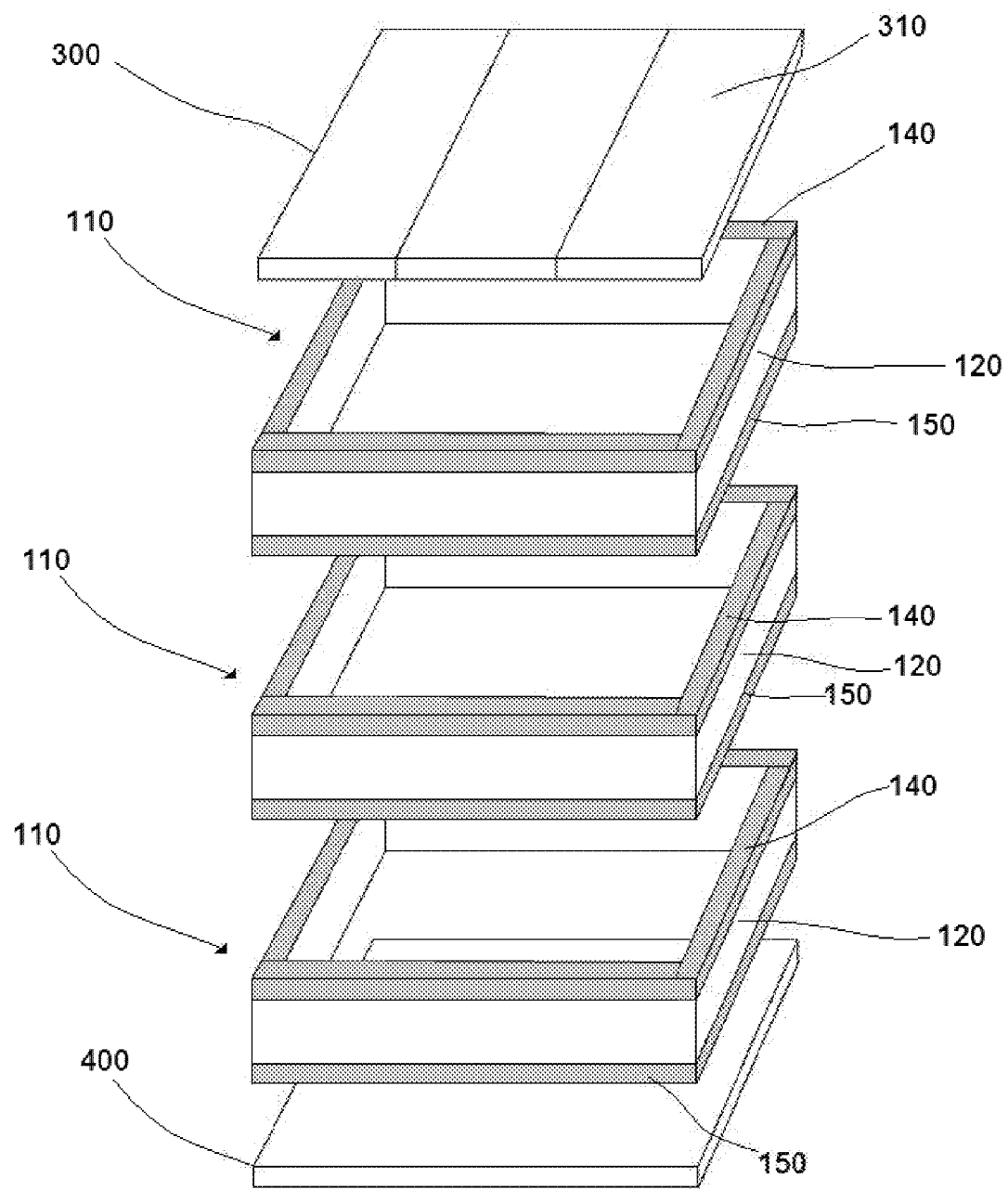
FIG. 6 is a an exploded perspective view of one aspect of the present invention, whereby the depicted embodiment has three retention tiers with each retention tier having four sides, a cover comprising three sub-covers, and a floor.
Figure 7:
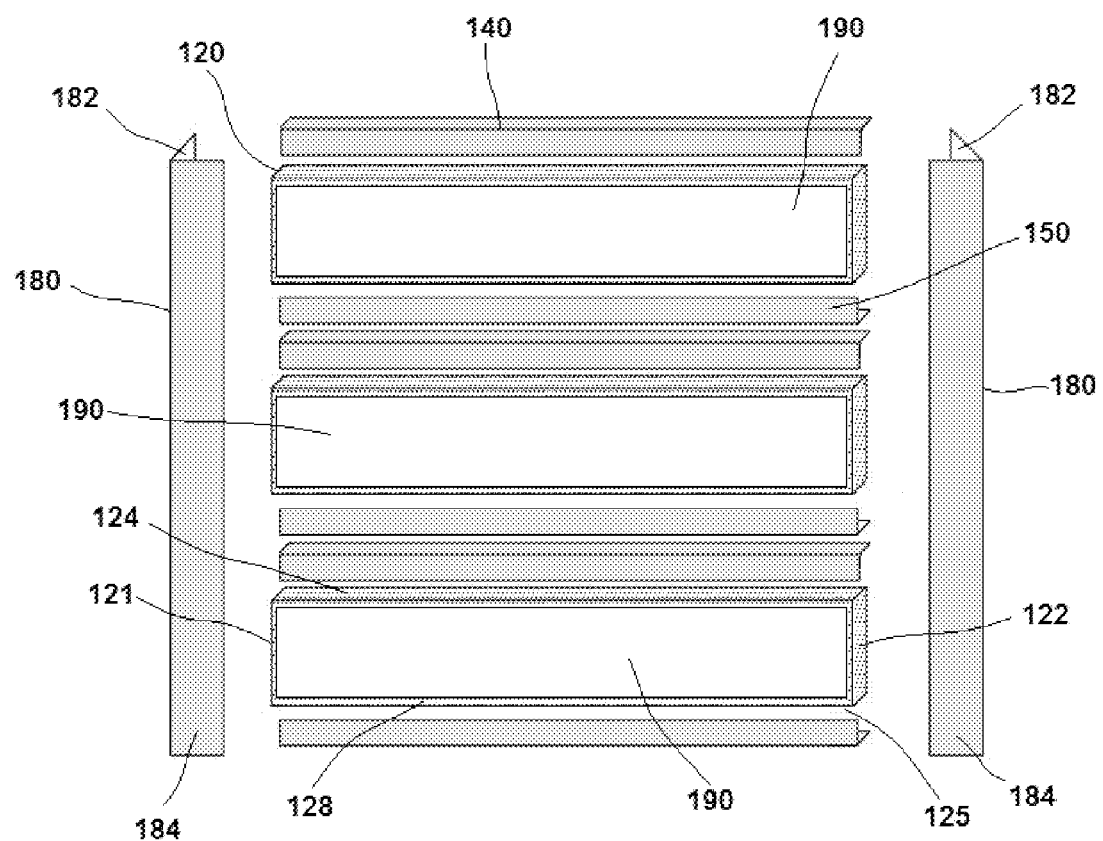
FIG. 7 is a front perspective exploded view of a side of one embodiment of the present invention. Each of the side walls of the three retention tiers uses top and bottom reinforcement members, and the side is fitted with corner members.

Each of the retention tiers 110 comprising the support structure 100 has three or more substantially rigid, substantially planar side walls 120. In the preferred embodiment each of the retention tiers 110 has four side walls 120, forming a substantially rectangular continuous circumferential enclosure, open at the top and bottom. See FIG. 3. In other configurations each retention tier 110 may comprise six side walls to form a hexagon, or eight side walls to form an octagon, or any other number of side walls to form any preferred shape. Each retention tier 110 must have the same number of side walls 120 as each other retention tier 110. See FIG. 6. The side walls 120 of each retention tier 110 should be substantially the same shape and size and arranged in substantially the same configuration as the side walls 120 of each other retention tier 110. So configured, the retention tiers 110 are stacked vertically one on top of another, thereby forming the sides 102 of the support structure 100. See FIGS. 1 and 7.

Figure 4:
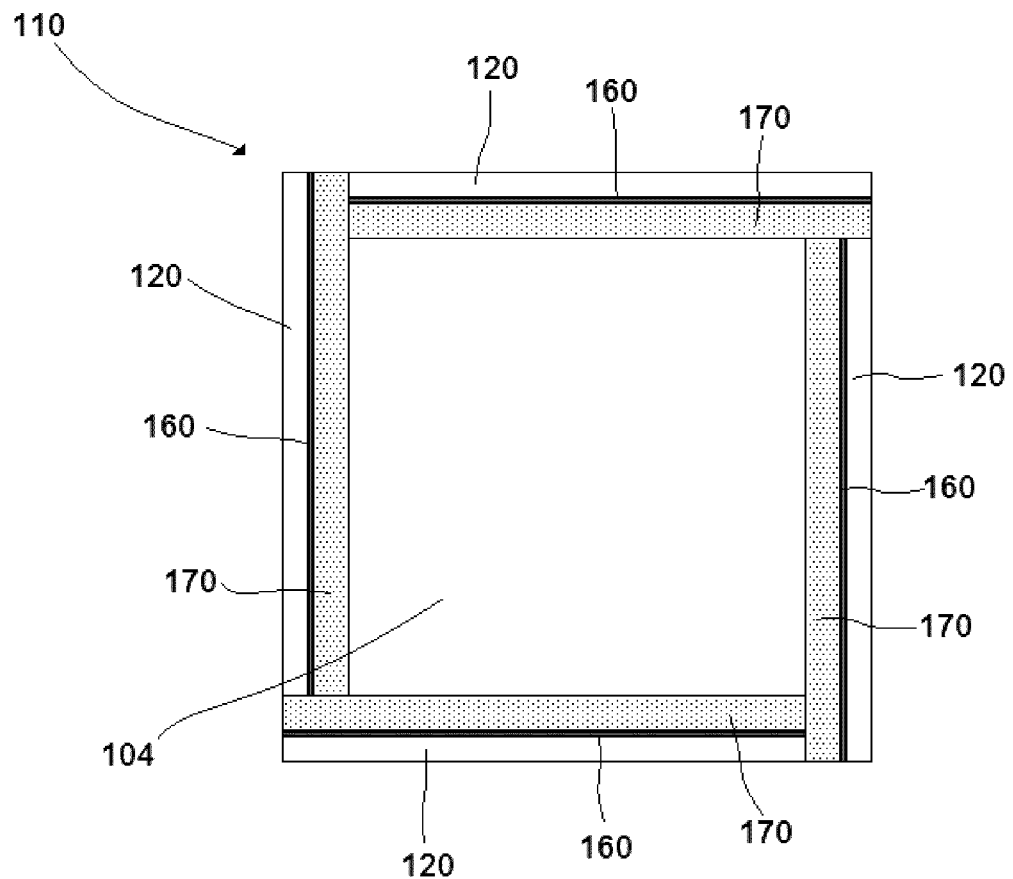
FIG. 4 is a top plan view of a retention tier. In the depicted embodiment each side wall of the retention tier has attached to its interior surface a flat metal panel, and onto each flat metal panel a flat insulating foam panel. No reinforcement members are shown.
Figure 5:
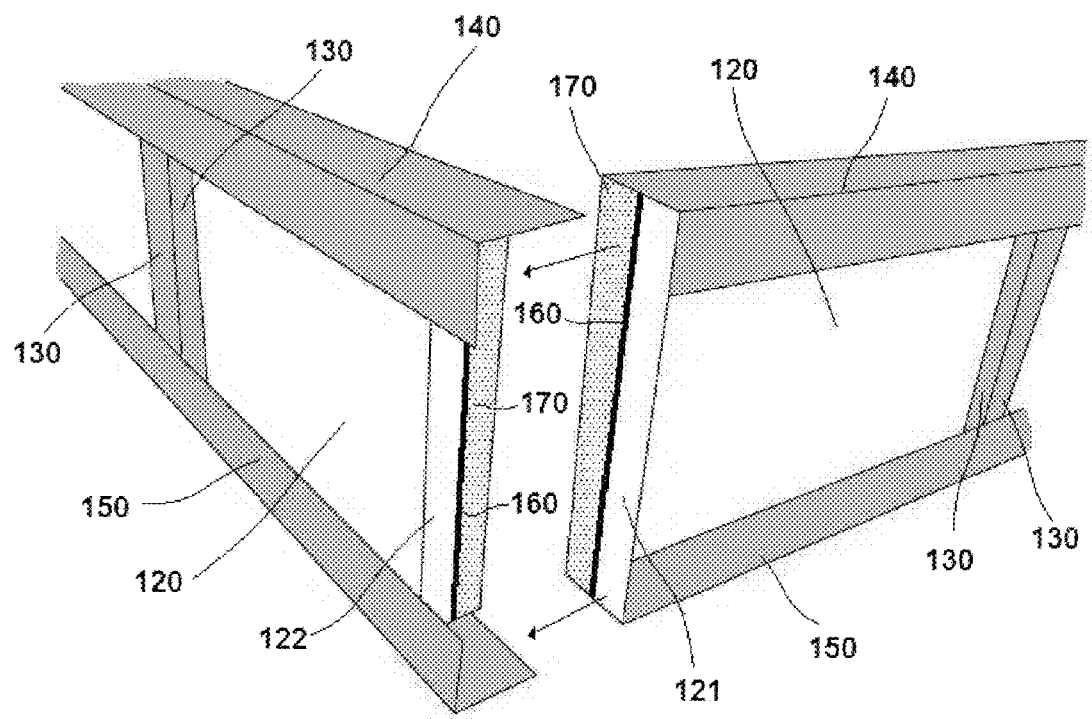
FIG. 5 is a perspective view of the detail of a corner of a retention tier. In the embodiment depicted each side wall of the retention tier has attached to its interior surface a flat metal panel, and onto each flat metal panel a flat insulating foam panel. The top and bottom reinforcement members of one side wall extend beyond the second lateral end of the side wall, thereby providing attachment points for the second side wall. Arrows show how the second side wall is positioned against the first side wall to form the corner.

Each of the individual side walls 120 of each retention tier 110 should be substantially rectangular. Pairs of adjacent side walls 120 are removably joined to each other at their respective adjacent lateral ends 121, 122 such that the side walls 120 form a continuous circumferential enclosure. See FIG. 4. The adjacent pairs of side walls 120 are removably attached to each other at their junctions, to facilitate storage and shipping. See FIG. 5. All of the side walls 120 of each retention tier 110 should be of substantially uniform height, such that the top and bottom sides of each retention tier 110 are substantially parallel to each other and oriented substantially horizontally.

The side walls 120 of the retention tiers 110 may be constructed of any substantially rigid insulating material. In the preferred embodiment each of the side walls 120 of each retention tier 110 is constructed of a rigid foam material. Rigid foam panels are typically formed of polystyrene, polyisocyanurate (polyiso), and polyurethane, but may be formed of any other suitable material known in the art. Each of the side walls 120 of each retention tier 110 may further utilize one or more substantially rigid vertical reinforcement members 130, each said vertical reinforcement member 130 being oriented substantially vertically and integrated within a side wall 120. See FIG. 5. In one embodiment the vertical reinforcement members 130 are configured as angles, having two substantially planar flanges oriented substantially ninety degrees to each other. In the preferred embodiment the vertical reinforcement members 130 are made of aluminum. However, they may be made of other materials having suitable rigidity and strength. In the most preferred embodiment the vertical reinforcement members 130 are configured as channel iron or channel steel having a squared-off "U" profile, with a vertical reinforcement member 130 fitted over each lateral end of each rigid foam sub-panel. The vertical reinforcement members 130 may be affixed to the sub-panels by mechanical fasteners, or by an adhesive, or both. In a preferred embodiment the side walls 120 are comprised of a plurality of substantially rectangular rigid foam sub-panels, with one or more vertical reinforcement members 130 placed between pairs of adjacent sub-panels.

In another embodiment each of the side walls 120 of each retention tier 110 further comprises a substantially rigid top reinforcement member 140 and a substantially rigid bottom reinforcement member 150. See FIG. 5. Both horizontal reinforcement members 140,150 are oriented substantially horizontally, with the top reinforcement member 140 located along the top side 124 of the side wall 120 and the bottom reinforcement member 150 located along the bottom side 125 of the side wall 120. See FIG. 7. In one embodiment the horizontal reinforcement members 140,150 are configured as angles, having two substantially planar flanges oriented substantially ninety degrees to each other. In the preferred embodiment the horizontal reinforcement members 140,150 are made of aluminum. However, they may be made of other materials having suitable rigidity and strength. In the most preferred embodiment the horizontal reinforcement members 140,150 are configured as channel iron or channel steel having a squared-off "U" profile, with the top reinforcement member 140 fitted over the top side 124 of the side wall 120 and the bottom reinforcement member 150 fitted over the bottom side 125 of the side wall 120. The horizontal reinforcement members 140,150 may be affixed to the side walls 120 by mechanical fasteners, or by an adhesive, or both. In other embodiments portions of the ends of the horizontal reinforcement members 140,150 may extend beyond the ends 121,122 of the side walls 120 to provide interlocking flanges for securing pairs of side walls 120 to each other, by screws or other appropriate fasteners.

The water tank 1 may further comprise corner members 180, each corner member 180 being substantially the same height as the fully assembled support structure 100 and suitably adapted to be placed over the junction of a pair of adjacent sides 102 of the support structure 100. See FIGS. 1 and 7. Each corner member 180 should be rigid, constructed of aluminum, steel, rigid plastic, or the like. Each corner member 180 should further have a left flange 182 and a right flange 184, with the left flange 182 angled from the right flange 184 to the substantially same degree as the corresponding adjacent sides 102 are angled to each other. In the preferred embodiment, where the support structure 100 has four sides 102 and a substantially rectangular configuration there are four corner members 180, and the left and right flanges 182,184 of each corner member 180 are angled substantially ninety degrees from each other. See FIG. 7. Each corner member 180 is placed onto a corner of the support structure 100 such that the left flange 182 of the corner member 180 is adjacent to and affixed to one of the sides 102 of the corresponding pair of adjacent sides 102 and the right flange 184 of the corner member 180 is adjacent to and affixed to the other side 102 of the corresponding pair of adjacent sides 102. The corner members 180 may be affixed to the sides 102 by mechanical fasteners, or by an adhesive, or both.

In yet another embodiment, each of the side walls 120 of each of the retention tiers 110 has one or more flat metal panels 160 affixed to its inner surface 127. See FIGS. 4 and 5. These panels 160 may cover substantially the entire inner surface 127 of each side wall 120. The metal panels 160 add further rigidity to the retention tiers 110. The metal panels 160 may be affixed to the inner surfaces 127 of the side walls 120 by mechanical fasteners, or by an adhesive, or both. In yet another embodiment one or more flat insulating foam panels 170 may be affixed to the metal panels 160. See FIGS. 4 and 5. The foam panels 170 create a thermal break between the liner 200 and the metal components of the side wall 120, thereby minimizing heat loss.

In still another embodiment, each of the side walls 120 of each of the retention tiers 110 has one or more protective panels 190 affixed to its outer surface 128. See FIG. 7. These panels 190 may cover substantially the entire outer surface 128 of each side wall 120. The panels 190 add further rigidity to the retention tiers 110 and protect the retention tiers 110 from damage. The panels 190 may be made of metal, plastic, wood, or any other suitable material, and may be affixed to the outer surfaces 128 of the side walls 120 by mechanical fasteners, or by an adhesive, or both.

The support structure 100 of the water tank 1 may be comprised of any number of vertically stacked retention tiers 110. In the preferred embodiment the support structure 100 is comprised of three retention tiers 110. See FIGS. 1 and 7. In the most preferred embodiment the lowermost retention tier 110 has a height shorter than the heights of the other two retention tiers 110. This provides the lowermost retention tier 110 with a superior load bearing capability. In other embodiments gussets are used to help distribute the load of the fluid contained within the water tank 1. In yet other embodiments wherein the water tank 1 is designed to contain a relatively large amount of fluid (in excess of 1000 gallons) strapping may be utilized circumferentially about the lowermost retention tier 110 to further resist the potential for buckling of the side walls 120 of that retention tier 110.

In another embodiment of the water tank 1, a floor 400 is used. See FIG. 6. In this embodiment the floor 400 is placed beneath and attached to the bottom of the support structure 100, forming a lowermost portion of the water tank 1. The floor 400 is substantially planar, so that a large proportion of its lower surface area is in contact with the surface upon which it is placed. The floor 400 should also be thermally isolatable, to minimize heat loss from the fluid contained within the water tank 1. In another embodiment the floor 400 is constructed of the same material as comprises the rigid sides 102 of the support structure 100.

Figure 8:
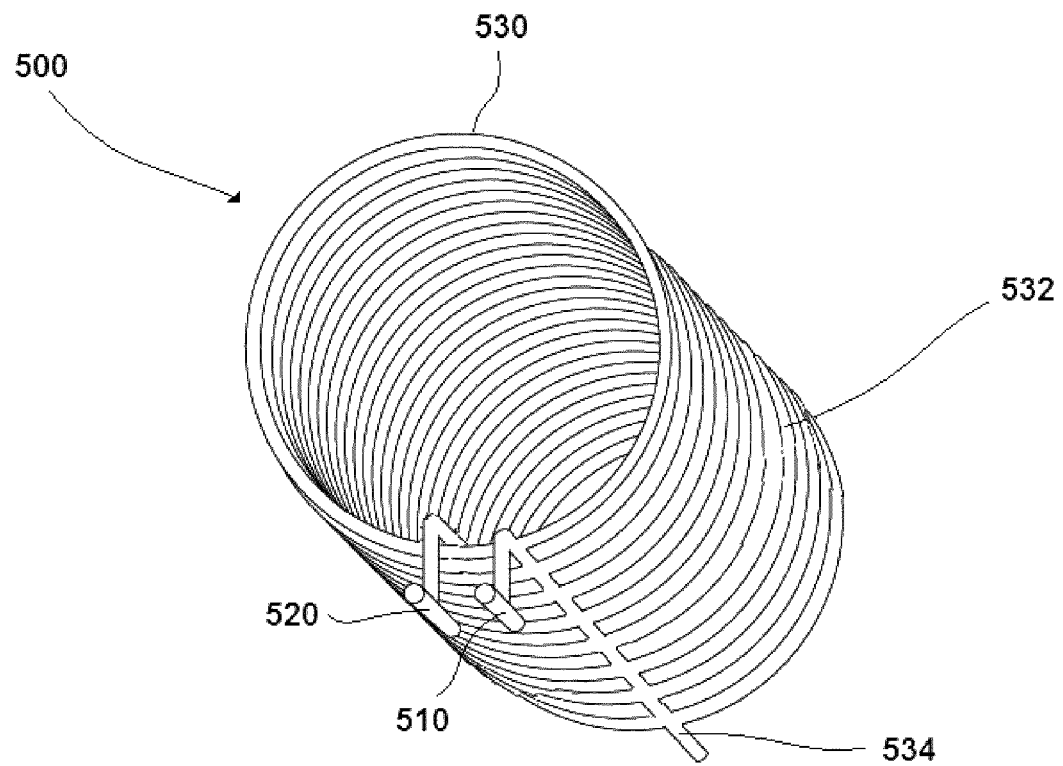
FIG. 8 is a perspective view of one embodiment of the heating system interface shown in FIG. 2, comprising a fluid inflow conduit, a fluid outflow conduit, and a heat exchanger formed of a plurality of coiled copper tubing tied together by an inflow manifold.

The water tank 1 may include a heating system interface 500 which is used to transfer heat energy into and out of the water tank 1. See FIG. 2. The heating system interface 500 may be comprised of a fluid inflow conduit 510, a fluid outflow conduit 520, and a heat exchanger 530. See FIG. 8. The fluid inflow conduit 510 must be capable of transporting a first fluid from a location exterior to the water tank 1 into the interior of the water tank 1. The fluid outflow conduit 520 must be capable of transporting the first fluid from within the interior of the water tank 1 to a location exterior to the water tank 1. The heat exchanger 530 must be capable of transferring heat energy between the first fluid and a second fluid that is retained within the of the water tank 1. The fluid inflow conduit 510, the heat exchanger 530, and the fluid outflow conduit 520 are placed in respective serial fluid communications with one another to circulate the first fluid into and out of the water tank 1. In one embodiment the fluid inflow conduit 510 and the fluid outflow conduit 520 are comprised of copper tubing. However, other materials are also contemplated.

In a typical configuration, the water tank 1 will be used in both heat storage mode and in heat usage mode. In heat storage mode, the first fluid will preferably be water, which will receive heat energy from an external heat source, such as a boiler, solar collectors, a wood stove, or the like. The second fluid will also preferably be water, retained within the water tank 1. The water heated from the external heat source will flow into the water tank 1 via the inflow conduit 510, give up heat energy to the water contained within the water tank 1 via the heat exchanger 530, and then flow out of the water tank 1 via the fluid outflow conduit 520. The first fluid may be circulated by use of a circulating pump. In this mode, the second fluid absorbs and retains heat energy from the first fluid for future use. In heat usage mode, the first fluid will have a lower temperature than the second fluid; this colder water will flow into the water tank 1 via the fluid inflow conduit 510, absorb heat energy from the water contained within the water tank 1 via the heat exchanger 530, and then flow out of the water tank 1 via the fluid outflow conduit 520 to an external heating system or domestic hot water system. The first fluid may be circulated by use of a circulating pump.

The heat exchanger 530 may be any type of heat exchanger known in the art that permits the exchange of heat energy between the first and second fluids. In the preferred embodiment the heat exchanger 530 will be located within the interior 104 of the support structure 100 inside the liner 200 and will be submerged within the second fluid. See FIG. 2, In one embodiment the heat exchanger 530 may be comprised of a plurality of coiled copper tubing 532, each said coil 532 attached in parallel to an inflow manifold 534. See FIG. 8. Each of the coiled copper tubing 532 should have a relatively small inside diameter, to increase the surface-to-volume ratio of the tubing 532 as well as to increase the amount of turbulence of the first fluid when it passes through the tubing 532, thereby accelerating the exchange of heat energy. In the most preferred embodiment the inside diameter of the coiled copper tubing 532 is between 3/8 inches and 5/8 inches. In this embodiment a sufficient number of parallel copper tubes 532 are used to minimize back pressure on the inflow of the first fluid via the fluid inflow conduit 510. The preferred number of parallel copper tubes 532 is between two and nine.

While many different configurations of the present invention are possible, in the most preferred embodiment the support structure 100 will be comprised of three stacked retention tiers 110, each retention tier 110 comprised of four side walls 120 in a substantially rectangular configuration, with the side walls 120 of each retention tier 110 comprised of rigid foam and incorporating both vertical and horizontal reinforcement members 130,140,150 and interior metal and foam panels 160,170, with the support structure 100 having four corner members 180 and a floor 400, the cover 300 being comprised of two sub-covers 310, and the water tank 1 having a fluid inflow conduit 510, fluid outflow conduit 520, and heat exchanger 530 all comprised of copper tubing. The water tank 1 may be manufactured and shipped as disassembled components, for ease of shipment as well as ease of placing the water tank 1 in its proper location, for example in a basement with difficult access. For installation, the side walls 120 are assembled into the retention tiers 110; the lowermost retention tier 110 is placed onto and attached to the floor 400 and the remaining retention tiers 110 are stacked onto each other; the corner members 180 are fastened to the corners of the support structure 100; the liner 200 is placed within the support structure 100; the fluid inflow conduit 510, fluid outflow conduit 520, and heat exchanger 530 are properly placed within the water tank 1; and the cover 300 is placed over the top of the support structure 100. The fluid inflow and outflow conduits 510,520 are plumbed and then the liner 200 is filled with water to ready the water tank 1 for use.

What has been described and illustrated herein is a preferred embodiment of the invention along with some it its variations. The terms, descriptions and figures used herein are set forth by way of illustration only and are not meant as limitations. Those skilled in the art will recognize that many variations are possible within the spirit and scope of the invention as defined in the following claims in which all terms are meant in their broadest, reasonable sense unless otherwise indicated.

I claim:

1. A modular insulated water tank comprising
a support structure, a liner, a cover, two or more sub-covers, four corner members, a floor, a fluid inflow conduit, a fluid outflow conduit, and a heat exchanger;
with the support structure being comprised of two or more separable, stackable retention tiers, said support structure being a substantially hollow enclosure formed of a plurality of substantially rigid sides surrounding an interior, said sides being thermally isolated, said support structure capable of containing and supporting the liner within its interior,
wherein each of the retention tiers has four side walls, with each of said side walls of each retention tier being substantially planar and substantially rectangular, and having a first lateral end and a second lateral end, a top side and a bottom side, and an inner surface and an outer surface,
with pairs of the side walls of each retention tier removably joined to each other at their respective ends such that all of the side walls of each retention tier form a substantially rectangular continuous circumferential enclosure, and
with all side walls of each retention tier having a substantially uniform height,
whereby each retention tier has the same number of side walls as each other retention tier, said side walls of each retention tier being of substantially the same shape and size and arranged in substantially the same configuration as the side walls of each other retention tier;
the liner being a flexible container capable of retaining fluids within an interior portion thereof;
the cover being capable of enclosing contents contained within the liner within the interior of the support structure, said cover being thermally isolated;
each said corner member being substantially rigid and being comprised of a left flange and a right flange, with the left flange angled substantially ninety degrees from the right flange, each said corner member being substantially the same height as the support structure,
wherein each said corner member is placed onto a corner of the support structure formed by the junction of each pair of sides of the support structure, with the left flange of said corner member adjacent to and affixed to one of the sides of said corresponding pair of sides and the right flange of said corner member adjacent to and affixed to the other side of said corresponding pair of sides;
said floor being attached to the lowermost retention tier, said floor being adjacent to the bottom sides of the side walls of said lowermost retention tier, thereby forming a lowermost portion of the modular insulated water tank, said floor being thermally isolated;

said sub-covers comprising the cover;

said fluid inflow conduit comprised of copper tubing;

said fluid outflow conduit comprised of copper tubing; and said heat exchanger comprised of a plurality of coiled copper tubing, each said coil attached in parallel to a manifold;

with the fluid inflow conduit being capable of transporting a first fluid from a location exterior to the modular insulated water tank into the modular insulated water tank, the fluid outflow conduit being capable of transporting the first fluid from within the modular insulated water tank to a location exterior to the modular insulated water tank, and the heat exchanger being capable of transferring heat energy between the first fluid and a second fluid, said second fluid being retained within the modular insulated water tank;

wherein the fluid inflow conduit, the heat exchanger, and the fluid outflow conduit are placed in respective serial fluid communications with one another to thereby circulate the first fluid into and out of the modular insulated water tank.

2. The modular insulated water tank of claim 1 comprising three retention tiers, wherein each of the four side walls of each of the three retention tiers is constructed of a rigid foam material and further comprises one or more flat metal panels affixed to its inner surface;

one or more flat foam panels affixed to the one or more flat metal panels;

one or more flat protective panels affixed to its outer surface;

one or more substantially rigid vertical reinforcement members, each said vertical reinforcement member oriented substantially vertically;

a substantially rigid top reinforcement member, said top reinforcement member oriented substantially horizontally and located along the top side of said side wall, said top reinforcement member of said side wall comprised of a main body, an inner flange, and an outer flange, wherein the main body of said top reinforcement member is oriented substantially horizontally, the inner flange of said top reinforcement member depends downward from the main body of the top reinforcement member, and the outer flange of said top reinforcement member depends downward from the main body of said top reinforcement member, such that the inner and outer flanges of said top reinforcement member are substantially parallel to each other, and the inner flange, main body, and outer flange of said top reinforcement member form a squared off U-shape in cross section, whereby the inner flange of said top reinforcement member is located adjacent to the inner surface of said side wall and the outer flange of said top reinforcement member is located adjacent to the outer surface of said side wall; and a substantially rigid bottom reinforcement member, said bottom reinforcement member oriented substantially horizontally and located along the bottom side of said side wall, said bottom reinforcement member of said side wall is comprised of a main body, an inner flange, and an outer flange, wherein the main body of said bottom reinforcement member is oriented substantially horizontally, the inner flange of said bottom reinforcement member depends upward from the main body of said bottom reinforcement member, and the outer flange of said bottom reinforcement member depends upward from the main body of said bottom reinforcement member, such that the inner and outer flanges of said bottom reinforcement member are substantially parallel to each other, and the inner flange, main body, and outer flange of said bottom reinforcement member form a squared off U-shape in cross section, whereby the inner flange of said bottom reinforcement member is located adjacent to the inner surface of said side wall and the outer flange of said bottom reinforcement member is located adjacent to the outer surface of said side wall.

3. A modular insulated water tank comprising a support structure, a liner, a cover, a floor, a fluid inflow conduit, a fluid outflow conduit, and a heat exchanger;

with the support structure being comprised of two or more separable, stackable retention tiers, said support structure being a substantially hollow enclosure formed of a plurality of substantially rigid sides surrounding an interior, said sides being thermally isolated, said support structure capable of containing and supporting the liner within its interior, wherein each of the retention tiers has four side walls, with each of said side walls of each retention tier being substantially planar and substantially rectangular, and having a first lateral end and a second lateral end, a top side and a bottom side, and an inner surface and an outer surface, with pairs of the side walls of each retention tier removably joined to each other at their respective ends such that all of the side walls of each retention tier form a substantially rectangular continuous circumferential enclosure, and with all side walls of each retention tier having a substantially uniform height, whereby each retention tier has the same number of side walls as each other retention tier, said side walls of each retention tier being of substantially the same shape and size and arranged in substantially the same configuration as the side walls of each other retention tier;

the liner being a flexible container capable of retaining fluids within an interior portion thereof;

the cover being capable of enclosing contents contained within the liner within the interior of the support structure, said cover being thermally isolated;

the floor being attached to the lowermost retention tier, said floor being adjacent to the bottom sides of the side walls of said lowermost retention tier, thereby forming a lowermost portion of the modular insulated water tank, said floor being thermally isolated;

the fluid inflow conduit comprised of copper tubing;

the fluid outflow conduit comprised of copper tubing; and the heat exchanger comprised of a plurality of coiled copper tubing, each said coil attached in parallel to a manifold;

with the fluid inflow conduit being capable of transporting a first fluid from a location exterior to the modular insulated water tank into the modular insulated water tank, the fluid outflow conduit being capable of transporting the first fluid from within the modular insulated water tank to a location exterior to the modular insulated water tank, and the heat exchanger being capable of transferring heat energy between the first fluid and a second fluid, said second fluid being retained within the modular insulated water tank;

wherein the fluid inflow conduit, the heat exchanger, and the fluid outflow conduit are placed in respective serial fluid communications with one another to thereby circulate the first fluid into and out of the modular insulated water tank.

* * * * *